(12) United States Patent
Nichols et al.

(10) Patent No.: US 8,166,728 B1
(45) Date of Patent: May 1, 2012

(54) PROTECTIVE SHIELD ASSEMBLY AND METHOD

(75) Inventors: William Dale Nichols, Shreveport, LA (US); Thomas Olen Wynn, Jr., Shreveport, LA (US); Jay Paul Jones, Shreveport, LA (US)

(73) Assignee: Gordon Incorporated, Bossier City, LA (US)

( * ) Notice: Subject to any disclaimer, the term of this patent is extended or adjusted under 35 U.S.C. 154(b) by 0 days.

(21) Appl. No.: 13/134,518

(22) Filed: Jun. 9, 2011

Related U.S. Application Data (63) Continuation of application No. 12/283,929, filed on Sep. 17, 2008, now abandoned.

(51) Int. Cl.
  *E04C 2/54* (2006.01)
(52) U.S. Cl. .............. 52/783.19; 52/483.1; 52/792.11; 52/745.1; 52/745.13
(58) Field of Classification Search ........... 52/783.11, 52/783.19, 792.1, 792.11, 483.1, 745.1, 745.13, 52/506.01, 506.05, 506.06, 506.1, 509–511
See application file for complete search history.

(56) References Cited

U.S. PATENT DOCUMENTS

| 184,086 | A | | 11/1876 | Kittredge et al. |
| 1,867,433 | A | | 7/1932 | Young |
| 1,949,045 | A | * | 2/1934 | Ferguson ............... 52/483.1 |
| 2,258,858 | A | * | 10/1941 | Meadowcroft ........... 428/594 |
| 2,302,949 | A | * | 11/1942 | Palmer .................. 52/588.1 |
| 2,691,242 | A | * | 10/1954 | Young ...................... 446/115 |
| 3,176,432 | A | * | 4/1965 | Doolittle, Jr ............ 52/293.3 |
| 3,669,821 | A | * | 6/1972 | Sharp ....................... 428/184 |
| 3,819,466 | A | * | 6/1974 | Winfield et al. ......... 428/175 |
| 4,125,977 | A | | 11/1978 | Michlovic |
| 4,379,191 | A | | 4/1983 | Beggs et al. |
| 4,414,257 | A | | 11/1983 | Haraga et al. |
| 4,433,023 | A | | 2/1984 | Ohta et al. |
| 4,617,777 | A | * | 10/1986 | Fonne et al. ............ 52/792.1 |
| 5,115,621 | A | | 5/1992 | Kobayashi |
| 5,632,126 | A | | 5/1997 | Agsten |
| 5,675,955 | A | * | 10/1997 | Champagne ............... 52/521 |
| 5,791,118 | A | * | 8/1998 | Jordan ................... 52/783.11 |
| 6,226,947 | B1 | * | 5/2001 | Bado et al. ............. 52/483.1 |
| 6,584,750 | B1 | * | 7/2003 | Hanna .................... 52/745.1 |
| 7,134,250 | B2 | * | 11/2006 | Forrester et al. ........ 52/406.3 |
| 7,191,570 | B1 | * | 3/2007 | Eaton .................... 52/506.09 |
| 7,677,002 | B2 | * | 3/2010 | Bennett et al. ............ 52/408 |
| 7,712,277 | B2 | * | 5/2010 | Swanson ................... 52/541 |
| 2002/0189195 | A1 | * | 12/2002 | McKague et al. ...... 52/783.19 |
| 2004/0237465 | A1 | * | 12/2004 | Refond .................. 52/783.11 |
| 2005/0016098 | A1 | * | 1/2005 | Hahn ........................ 52/384 |

FOREIGN PATENT DOCUMENTS

WO  PCT/IT98/00285  4/1999

\* cited by examiner

*Primary Examiner* — Brian Glessner
*Assistant Examiner* — Adriana Figueroa
(74) *Attorney, Agent, or Firm* — R. Keith Harrison

(57) ABSTRACT

A method of protecting an existing surface includes providing a surface to be protected; providing at least one shield section including a plurality of protective shield assemblies, each of the protective shield assemblies including a corrugated panel and a protective shield base carried by the corrugated panel; and attaching the corrugated panel to the surface with the protective shield assembly facing away from the surface.

14 Claims, 6 Drawing Sheets

PROTECTIVE SHIELD ASSEMBLY AND METHOD

CROSS-REFERENCE TO RELATED APPLICATIONS

This is a continuation application of parent U.S. application Ser. No. 12/283,929, filed Sep. 17, 2008 now abandoned and entitled "PROTECTIVE SHIELD ASSEMBLY", which parent application is incorporated by reference herein in its entirety.

FIELD

The present disclosure relates to protective shields for the exteriors of buildings. More particularly, the present disclosure relates to a protective shield assembly which can be assembled on a soffit or fascia of a building to protect the exterior of the building from storm damage or the like.

BACKGROUND

Many buildings have a soffit or protective cladding at the underside of a flight of stairs, a projecting cornice or the underside of a ceiling at the corner of the ceiling and wall. In houses, the soffit (or eave) forms a ceiling from the top of an exterior wall to the outer edge of the overhanging roof and bridges the gap between the exterior wall and the roofline. A soffit that extends from the horizontal to the vertical is known as a fascia or façade.

Placement of exterior protective material on soffits, fascias and facades of buildings and houses may be necessary in geographical areas which are vulnerable to storm conditions to prevent the damaging effects of winds which could otherwise penetrate or damage the soffit, fascia or façade. For example, buildings and houses in coastal and other geographical areas which receive high-velocity winds, as well as the exteriors of high-rise buildings, may require the use of exterior protective cladding. Therefore, a protective shield assembly which can be assembled on a soffit or fascia of a building or house to effectively protect the exterior of the building or house from storm damage or the like is needed.

SUMMARY

The present disclosure is generally directed to a method of protecting an existing surface. An illustrative embodiment of the method includes providing a surface to be protected; providing at least one shield section including a plurality of protective shield assemblies, each of the protective shield assemblies including a corrugated panel and a protective shield base carried by the corrugated panel; and attaching the corrugated panel to the surface with the protective shield assembly facing away from the surface.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Figure 1:
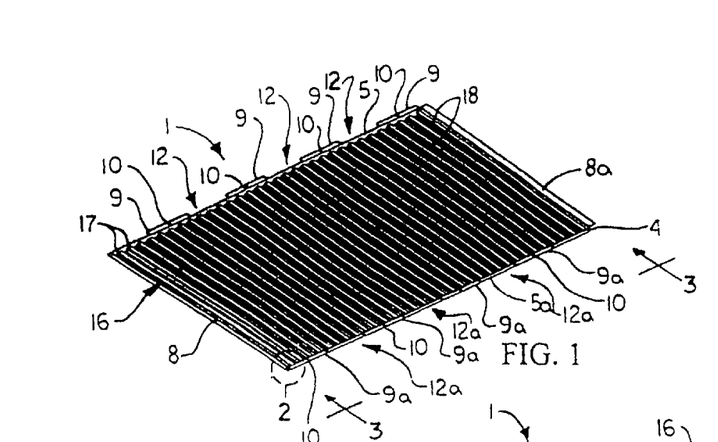
FIG. 1 is a rear perspective view of an illustrative embodiment of the protective shield assembly.
Figure 2:
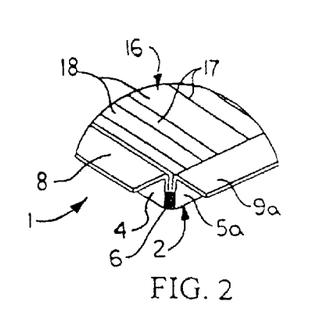
FIG. 2 is an enlarged sectional view, taken along section line 2 in FIG. 1, of an illustrative embodiment of the protective shield assembly.
Figure 3:
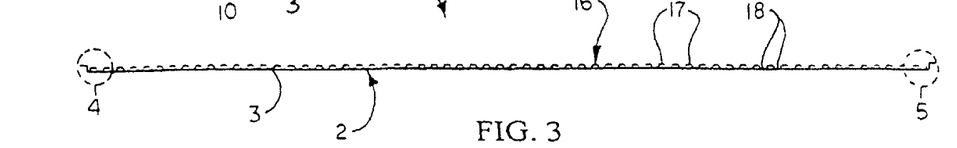
FIG. 3 is a side view, taken along viewing lines 3-3 in FIG. 1, of an illustrative embodiment of the protective shield assembly'
Figure 4:
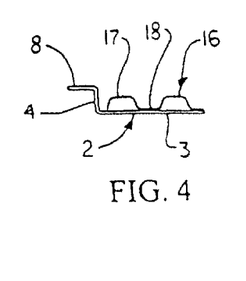
FIG. 4 is an enlarged sectional view, taken along section line 4 in FIG. 3, of a corner portion on an illustrative embodiment of the protective shield assembly.
Figure 5:
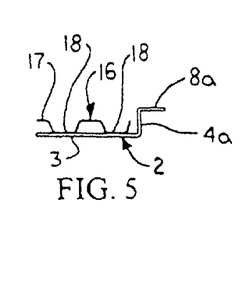
FIG. 5 is an enlarged sectional view, taken along section line 5 in FIG. 3, of an opposite corner portion on an illustrative embodiment of the protective shield assembly.
Figure 5A:
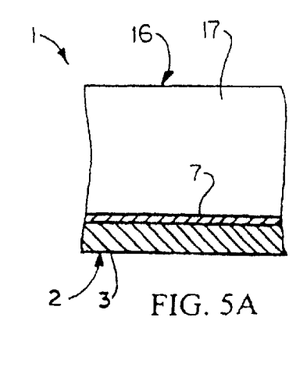
FIG. 5A is a transverse sectional view of a portion of an illustrative embodiment of the protective shield assembly, more particularly illustrating attachment of the corrugated panel to the protective shield base using an insulating adhesive.
Figures 6, 7, 8, 9, 10:
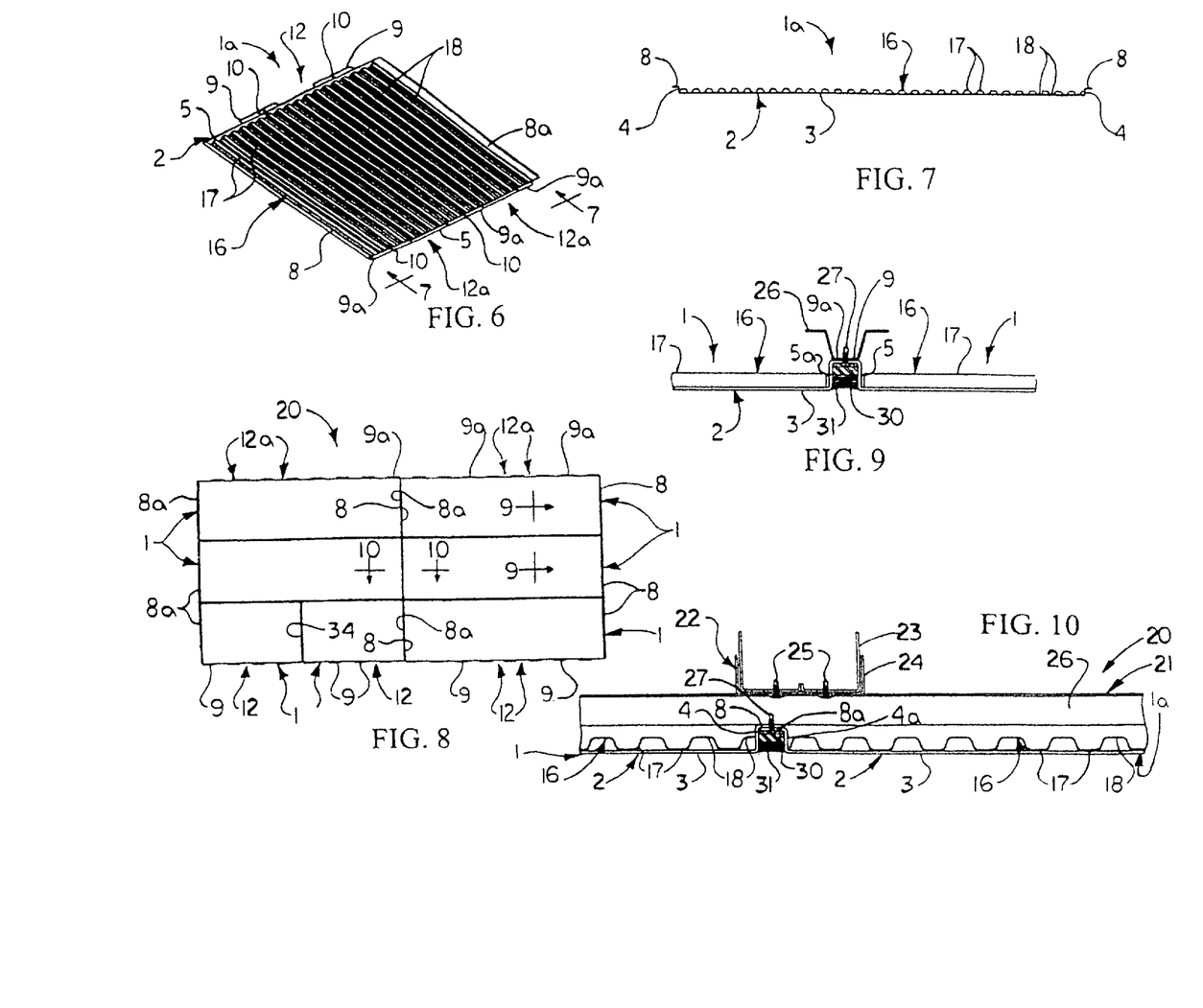
FIG. 6 is a perspective view of an illustrative embodiment of a half protective shield assembly.
FIG. 7 is a side view, taken along viewing lines 7-7 in FIG. 6, of an illustrative embodiment of the half protective shield assembly.
FIG. 8 is a bottom view of a ceiling section having multiple protective shield assemblies and a pair of half protective shield assemblies.
FIG. 9 is a sectional view, taken along section lines 9-9 in FIG. 8, more particularly illustrating adjacent alternating tab attachment of a pair of protective shield assemblies to each other in the ceiling section.
FIG. 10 is a sectional view, taken along section lines 10-10 in FIG. 8, more particularly illustrating end-to-end overlapping attachment of a pair of protective shield assemblies to each other in the ceiling section.

Referring initially to FIGS. 1-7 of the drawings, an illustrative embodiment of the protective shield assembly, hereinafter assembly, is generally indicated by reference numeral 1 in FIGS. 1-5A. Some applications of the protective shield assembly 1, which will be hereinafter described, may additionally utilize one or more half protective shield assemblies 1a, an illustrative embodiment of which is illustrated in FIGS. 6 and 7. The assembly 1 includes a protective shield base 2 which may be aluminum, for example and without limitation. The protective shield base 2 has a base panel 3 which may be generally planar, elongated and rectangular. First and second base panel end walls 4 and 4a, respectively, extend from the base panel 3 along respective ends thereof. First and second base panel side walls 5 and 5a, respectively, extend from the base panel 3 along respective edges thereof. As illustrated in FIGS. 4 and 5, each base panel end wall 4, 4a (and each base panel side wall 5, 5a) may be disposed in generally perpendicular relationship with respect to the plane of the base panel 3. As illustrated in FIG. 2 in some embodiments a filler material 6, which may be as caulk, for example and without limitation, may be provided between the edges of each base panel end wall 4, 4a and adjacent base panel side wall 5, 5a.

As illustrated in FIGS. 4 and 5, a first base panel end flange 8 extends outwardly from the first base panel end wall 4 (FIG. 4) and a second base panel end flange 8a extends outwardly from the second base panel end wall 4a (FIG. 5). Each base panel end flange 8, 8a may be disposed in generally perpendicular relationship with respect to the plane of the corresponding base panel end wall 4, 4a from which it extends. As illustrated in FIG. 1, a first set of multiple side shield attachment flanges 9 extends outwardly from the first base panel side wall 5 in spaced-apart relationship with respect to each other. A first set of flange gaps 12 separates the adjacent side shield attachment flanges 9 from each other. A second set of multiple side shield attachment flanges 9a extends outwardly from the second base panel side wall 5a in spaced-apart relationship with respect to each other. A second set of flange gaps 12a separates the adjacent side shield attachment flanges 9a from each other. As illustrated in FIG. 1, the side shield attachment flanges 9 of the first flange set may be offset or staggered with respect to the respective side shield attachment flanges 9a of the second flange set. Likewise, the flange gaps 12 of the first gap set may be offset or staggered with respect to the respective flange gaps 12a of the second gap set. A shield fastener opening 10 may extend through each side shield attachment flange 9 of the first flange set and each side shield attachment flange 9a of the second flange set for purposes which will be hereinafter described.

A corrugated panel 16 is provided on the base panel 3 of the protective shield base 2 between the first and second base panel end walls 4 and 4a, respectively, and between the first and second base panel side walls 5 and 5a, respectively. The corrugated panel 16 may be steel, for example and without limitation, and has multiple panel ridges 17 and intervening panel troughs 18. As illustrated in FIG. 1, the panel ridges 17 and panel troughs 18 of the corrugated panel 16 may extend transversely across the longitudinal axis of the base panel 3, in generally perpendicular relationship with respect to the first base panel side wall 5 and the second base panel side wall 5a and in generally parallel relationship with respect to the first base panel end wall 4 and the second base panel end wall 4a of the protective shield base 2.

Figure 5B:
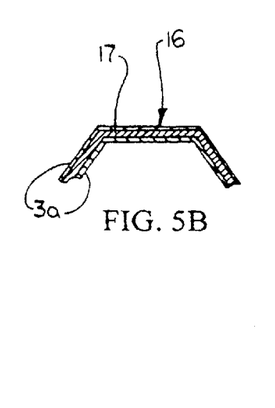
FIG. 5B is a cross-sectional view of a panel ridge of the corrugated panel, more particularly illustrating a galvanized coating on the corrugated panel.

As illustrated in FIG. 5A, in some embodiments an electrically-insulating adhesive 7 attached the corrugated panel 16 to the base panel 3. However, it is to be understood that the corrugated panel 16 may be attached to the base panel 3 using welding, fasteners (not illustrated) and/or other suitable attachment technique which is known by those skilled in the art. As further illustrated in FIG. 5B, in some embodiments a galvanized coating 3a may be provided on the respective surfaces of the corrugated panel 16. The galvanized coating 3a may be a zinc coating which may be applied to the surfaces of the corrugated panel 16 using a hot dip coating process or any other suitable coating process or technique which is known by those skilled in the art. The half protective shield assembly 1a which is illustrated in FIGS. 6 and 7 may be similar in design to that of the protective shield assembly 1 which was heretofore described with respect to FIGS. 1-6, except the length of the half protective shield assembly 1a may be approximately half or slightly less than half the length of the protective shield assembly 1.

Figure 18:
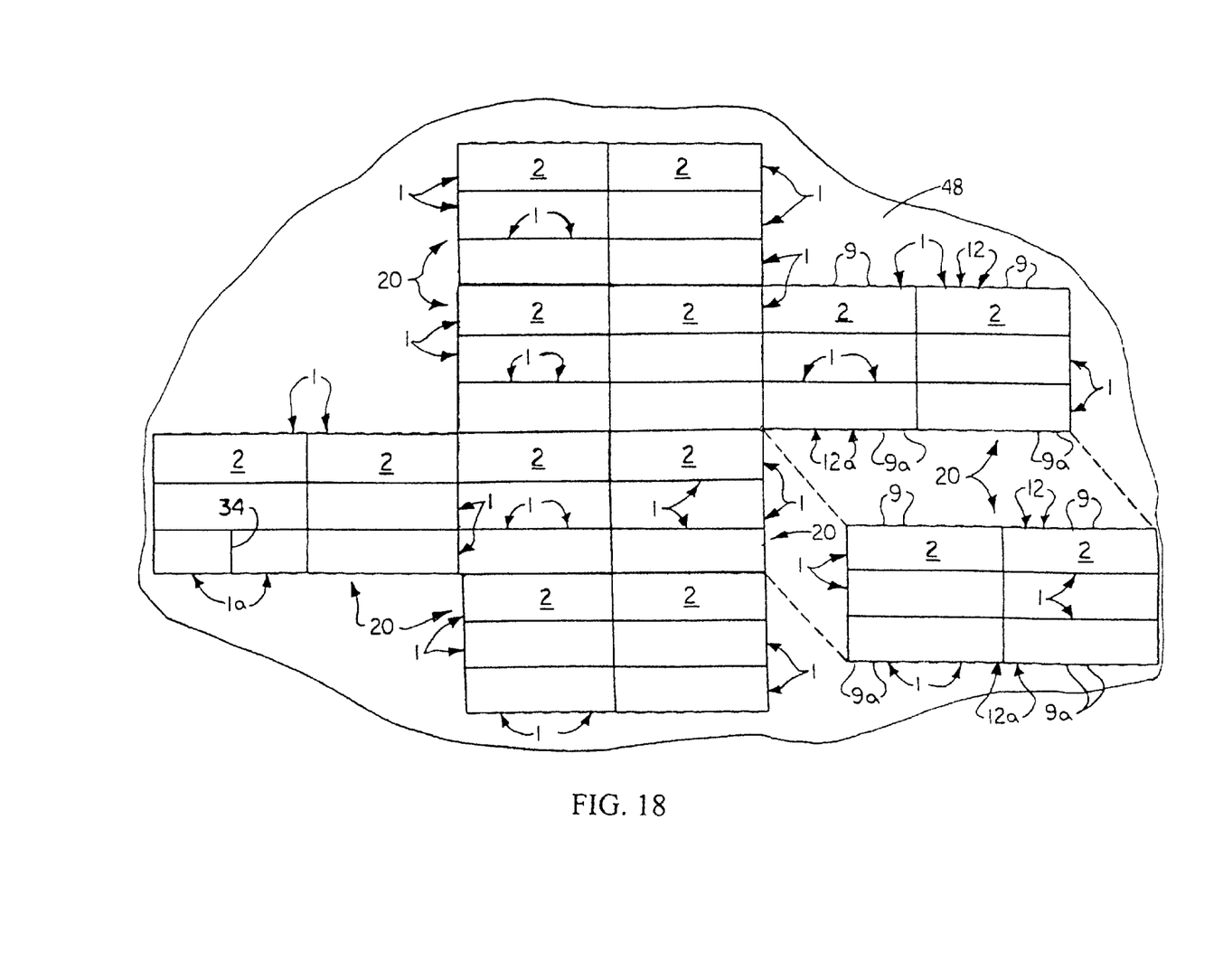
FIG. 18 is a bottom view of a ceiling (partially in section), with multiple ceiling sections each having multiple protective shield assemblies attached to the ceiling.

Referring next to FIGS. 8-15 and 18-22 of the drawings, an exemplary shield section 20 which utilizes multiple meshing protective shield assemblies 1 and a pair of half protective shield assemblies 1a is illustrated in FIG. 8. As illustrated in FIG. 18 and will be hereinafter described, multiple shield sections 20 can be attached to a surface 48 such as an exterior soffit, ceiling or fascia, for example and without limitation, of a building or structure (not illustrated) in adjacent meshing relationship with respect to each other to shield and protect the surface 48 from high winds and flying debris during storm conditions. The exemplary shield section 20 which is illustrated in FIG. 8 has five meshing protective shield assemblies 1 and two meshing half protective shield assemblies 1a; however, it is to be understood that each shield section 20 may have a greater or lesser number of meshing protective shield assemblies 1 and half protective shield assemblies 1a. A half shield access gap 34 may be defined between the adjacent half protective shield assemblies 1a to facilitate access to ceiling fixtures (not illustrated) and the like through the shield section 20 when the shield section 20 is attached to a ceiling or other surface (not illustrated), as will be hereinafter described.

Figure 19:
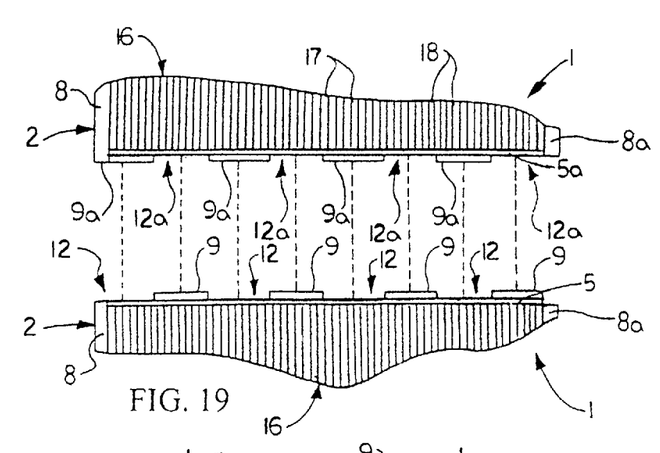
FIG. 19 is a top view, partially in section, of adjacent protective shield assemblies, more particularly illustrating side-to-side engagement of the protective shield assemblies with each other.
Figure 20:
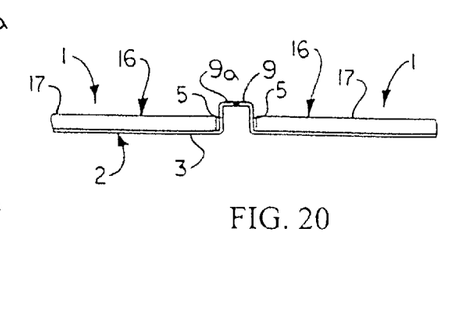
FIG. 20 is a side view, partially in section, of adjacent protective shield assemblies, more particularly illustrating side-to-side engagement of the protective shield assemblies with each other.

As illustrated in FIGS. 19 and 20, adjacent protective shield assemblies 1 which are disposed alongside each other in the shield section 20 may engage each other in a meshing manner by insertion of the side shield attachment flanges 9 of one protective shield assembly 1 into the respective registering flange gaps 12a which extend between the side shield attachment flanges 9a of the adjacent protective shield assembly 1. In like manner, the side shield attachment flanges 9a of one protective shield assembly 1 are inserted in the respective registering flange gaps 12 of the other protective shield assembly 1. As illustrated in FIG. 20, the side shield attachment flanges 9, 9a may alternate with each other to define a seam between the adjacent protective shield assemblies 1.

Figure 21:
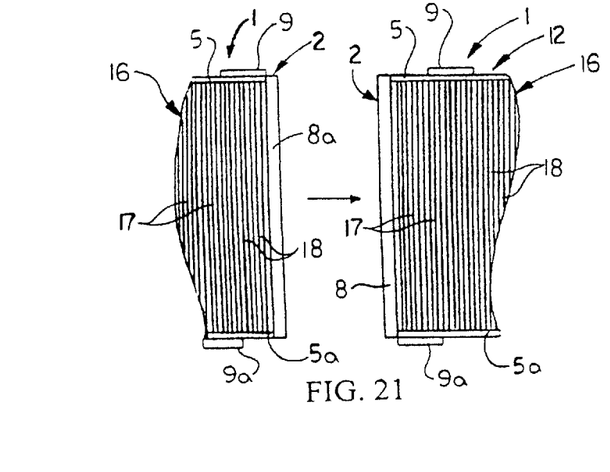
FIG. 21 is a top view, partially in section, of adjacent protective shield assemblies, more particularly illustrating end-to-end engagement of the protective shield assemblies with each other.
Figure 22:
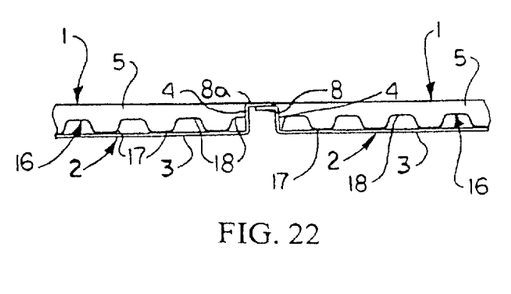
FIG. 22 is a side view, partially in section, of adjacent protective shield assemblies, more particularly illustrating end-to-end engagement of the protective shield assemblies with each other.

As illustrated in FIGS. 21 and 22, adjacent protective shield assemblies 1 which are disposed in end-to-end relationship with respect to each other in the shield section 20 may engage each other by insertion of the base panel end flange 8a of one protective shield assembly 1 over the non-registering base panel end flange 8 of the adjacent protective shield assembly 1. Along one longitudinal edge of each shield section 20, the side shield attachment flanges 9 and the flange gaps 12 of a pair of end-to-end protective shield assemblies 1 remain exposed, whereas along the opposite longitudinal edge of each shield section 20, the side shield attachment flanges 9a and flange gaps 12a of another pair of end-to-end protective shield assemblies 1 remain exposed to facilitate side-to-side meshing engagement of adjacent shield sections 20 in the same manner as the individual protective shield assemblies 1 are meshed with each other as was heretofore described. Likewise, along one transverse edge of each shield section 20, the base panel end flanges 8 of three side-to-side protective shield assemblies 1 remain exposed whereas along the opposite transverse edge of the shield section 20 the base panel end flanges 8a of three other side-to-side protective shield assemblies 1 remain exposed to facilitate end-to-end engagement of the adjacent shield sections 20.

Figures 11, 12, 12A, 13, 14, 15:
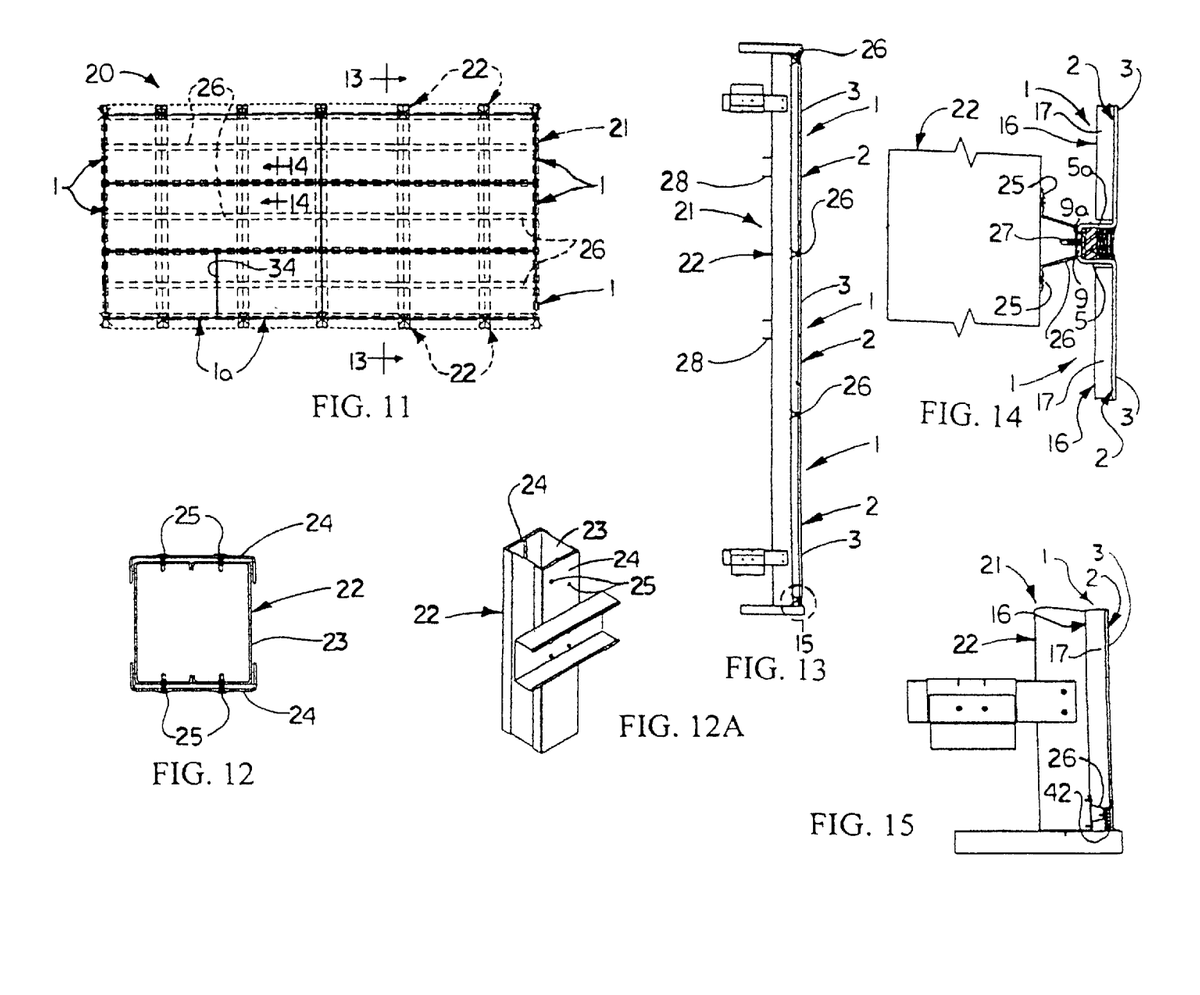
FIG. 11 is a bottom view of the ceiling section, with a ceiling section frame (illustrated in phantom) supporting the protective shield assemblies in the ceiling section.
FIG. 12 is an end view of a stud element of the ceiling section frame.
FIG. 12A is a perspective view, partially in section, of a stud element of the ceiling section frame, with a channel beam attached to the stud for attachment of the stud to a ceiling.
FIG. 13 is a side view of a stud, with multiple protective shield assemblies attached to the stud.
FIG. 14 is a side view (partially in section) of a stud, more particularly attachment of a pair of adjacently alternating tab protective shield assemblies to the stud via a hat channel beam.
FIG. 15 is an enlarged sectional view, taken along section line 15 in FIG. 13, more particularly illustrating an exemplary manner of attaching the stud of the ceiling section frame to a framing track.

As illustrated in FIG. 11, an exemplary shield section frame 21 which is suitable for supporting the meshing protective shield assemblies 1 in the shield section 20 is illustrated in phantom. The shield section frame 21 may include multiple frame studs 22 which extend along the transverse axis of the shield section 20 in generally parallel, spaced-apart relationship with respect to each other. As illustrated in FIG. 12, in some embodiments each frame stud 22 may include a stud core 23 having a generally square or rectangular cross-sectional shape. A pair of C-channel beams 24 may be attached to opposite sides of the stud core 23 using stud fasteners 25 and/or any other suitable attachment technique. Each frame stud 22 may have any alternative construction which is consistent with the use requirements of the frame studs 22 in the shield section frame 21.

Multiple generally elongated, parallel, spaced-apart hat channel beams 26 may extend along the longitudinal axis of the shield section 20 in intersecting relationship with respect to each frame stud 22. Each hat channel beam 26 may be attached to each frame stud 22 according to any suitable technique which is known by those skilled in the art. As illustrated in the sectional view of FIG. 10 (which is taken along section lines 10-10 in FIG. 8) and the sectional view of FIG. 14 (which is taken along section lines 14-14 in FIG. 11), in some embodiments this may be accomplished by extending the stud fasteners 25 through fastener openings (not illustrated) provided in the hat channel beam 26 and threading the channel beam fasteners 25 into respective fastener openings (not illustrated) provided in the frame stud 22.

As further illustrated in FIG. 14, the hat channel beams 26 attach the meshing protective shield assemblies 1 to the frame studs 22. The protective shield assemblies 1 may be attached to each hat channel beam 26 according to any suitable technique which is known by those skilled in the art. In some embodiments, a shield fastener 27 may be extended through each shield fastener opening 10 (FIG. 1) which extends through each side shield attachment flange 9, 9a of each protective shield assembly 1. The shield fastener 27 is threaded through a registering shield fastener opening (not illustrated) provided in the hat channel beam 26. As illustrated in FIGS. 9 and 14, in some applications, a seal or insert 30 and a filler 31, such as caulk, for example and without limitation, may be inserted in the gap between the base panel side wall 5 of one protective shield assembly 1 and the base panel side wall 5a of the adjacent protective shield assembly 1 for sealing purposes. As illustrated in FIG. 10, a seal or insert 30 and a filler 31 may also be inserted in the gap between the base panel end walls 4, 4a of adjacent end-to-end protective shield assemblies 1. As illustrated in FIG. 15, a backing 42 and a sealant (not illustrated) such as caulk may be provided between the outer edge of each protective shield assembly 1 which extends along at a longitudinal edge of the shield section 20 and the outermost hat channel beam 26.

In typical application of the protective shield assembly 1, multiple shield sections 20 are pre-assembled and then attached in meshing relationship with respect to each other to a surface 48 (FIG. 18) such as an exterior soffit, ceiling or fascia of a building or house, for example and without limitation, to protect the surface 48 from damage due to storm conditions such as high winds and flying debris. Accordingly, each frame stud 22 in the shield section frame 21 of each shield section 20 may be attached to the surface 48 using any suitable technique which is known by those skilled in the art. As illustrated in FIG. 12A, in some applications, multiple channel beams 28 (one of which is illustrated) may be attached to each frame stud 22 using channel beam fasteners 29 and/or other suitable technique known by those skilled in the art. Each channel beam 28 may be attached to the surface 48 or to a structural element (not illustrated) of the surface 48 typically using suitable fasteners (not illustrated). Accordingly, the corrugated panel 16 of each protective shield assembly 1 in each shield section 20 typically faces the surface 48, whereas the base panel 3 on the protective shield base 2 of each protective shield assembly 1 typically faces away from the surface 48, as illustrated in FIG. 18. Adjacent shield sections 20 are engaged with each other in side-by-side and meshing relationship with respect to each other by inserting the side shield attachment flanges 9 on the protective shield assemblies 1 along one longitudinal edge of each shield section 20 in the flange gaps 12a between the side shield attachment flanges 9a on the protective shield assemblies 1 along the opposite longitudinal edge of the adjacent shield section 20. Adjacent shield sections 20 are engaged with each other in end-to-end relationship with respect to each other by inserting the base panel end flanges 8a on the protective shield assemblies 1 along one transverse edge of each shield section 20 over the base panel end flanges 8 on the protective shield assemblies 1 along the opposite transverse edge of the adjacent shield section 20. At least one of the shield sections 20 may include a pair of adjacent half protective shield assemblies 1a having a half shield access gap 34 through which fixtures (not illustrated) and the like on the surface 48 can be accessed. It will be appreciated by those skilled in the art that the panel ridges 17 and the panel troughs 18 of the corrugated panel 16 of each protective shield assembly 1 and half protective shield assembly 1a impart torsional resistance to each protective shield assembly 1 and resists wind loads which would otherwise be applied against the surface 48 as well as debris which may otherwise strike and damage the surface 48. The shield sections 20 may be disassembled and removed from the surface 48 by reversing the steps which were outlined above.

Figure 16:
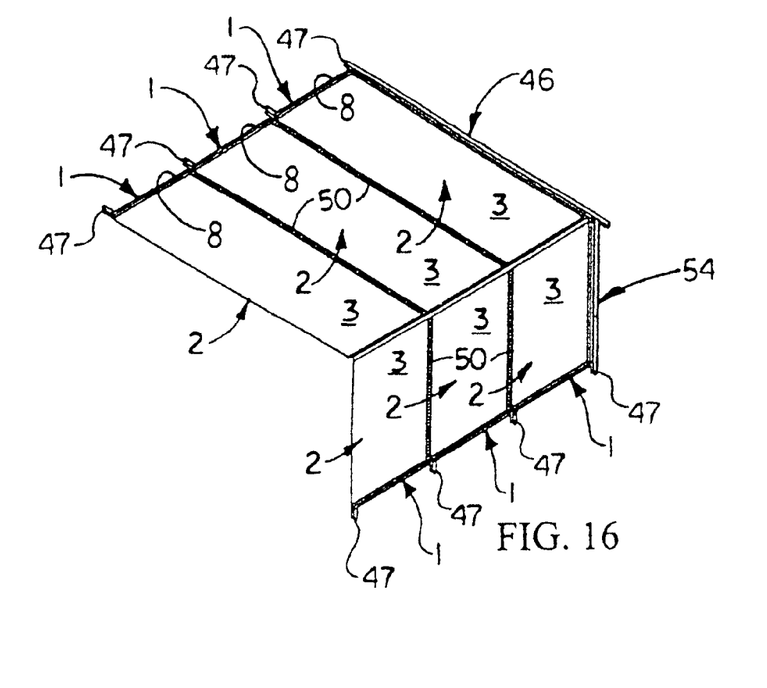
FIG. 16 is a perspective view of a ceiling section and an adjacent fascia section each having multiple protective shield assemblies.
Figure 17:
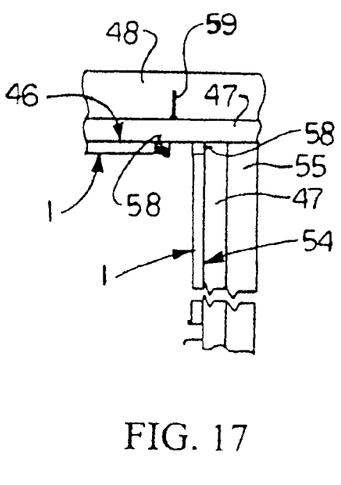
FIG. 17 is a side view of the ceiling section and the fascia section illustrated in FIG. 16, with the ceiling section attached to a ceiling (in section) and the fascia section attached to a fascia (in section) of a building.

Referring next to FIGS. 16 and 17 of the drawings, in some applications one or multiple ceiling sections 46, each having multiple meshing protective shield assemblies 1, can be used to cover and shield a first surface 48 (FIG. 17) such as a soffit or ceiling, for example and without limitation. One or multiple fascia sections 54, each also having multiple meshing protective shield assemblies 1, can be used to cover and shield a second surface 55 (FIG. 17) such as an exterior fascia on a building, for example and without limitation, which may be disposed generally adjacent to and at an angle with respect to the first surface 48. In each of the ceiling section 46 and the fascia section 54, the side shield attachment flanges 9, 9a of each protective shield assembly 1 may be attached to a pair of C-channel beams 47 such as by assembly fasteners 58, as illustrated in FIG. 17. As further illustrated in FIG. 17, each C-channel beam 47 on the ceiling section 46 may be attached to the first surface 48 using multiple channel beam fasteners 59 or other suitable technique known by those skilled in the art. Each C-channel beam 47 on the fascia section 54 may be attached to the second surface 55 also using multiple channel beam fasteners 59 or any other suitable technique which is known by those skilled in the art. As illustrated in FIG. 16, a filler 50 such as caulk, for example and without limitation, may be applied to the gaps between adjacent protective shield assemblies 1 in the ceiling section 46 and the fascia section 54. Accordingly, the ceiling section or sections 46 and the fascia section or sections 54 cover and protect the first surface 48 and the second surface 55, respectively, from wind loads and flying debris during storm conditions, for example.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A method of protecting an existing surface, comprising:
providing a surface to be protected;
providing a plurality of protective shield assemblies each including:
protective shield base having a flat or planar base panel with base panel side edges and base panel end edges;
base panel side walls extending from said base panel side edges;
base panel end walls extending from said base panel end edges;
a plurality of spaced-apart side shield attachment flanges extending from said base panel side walls, flange gaps between said side shield attachment flanges and base panel end flanges extending from said base panel end walls, respectively;
a corrugated panel carried by said base panel of said protective shield base and having a plurality of panel ridges and a plurality of panel troughs alternating with said plurality of panel ridges;
assembling a plurality of shield sections from said plurality of protective shield assemblies by inserting said side shield attachment flanges of each of said protective shield assemblies into said flange gaps-of an adjacent one of said protective shield assemblies and positioning said base panel end flange of each of said protective shield assemblies over said base panel, end flange of an adjacent one of said protective shield assemblies;
and attaching said plurality of shield sections to the surface.

2. The method of claim 1 wherein said providing a surface to be protected comprises providing an exterior soffit or fascia of a building.

3. The method of claim 1 wherein said providing a surface to be protected comprises providing an exterior ceiling of a building.

4. The method of claim 1 wherein said assembling a plurality of shield sections from said plurality of protective shield assemblies comprises providing at least one shield section including a plurality of protective shield assemblies and at least one pair of half protective shield assemblies and a half shield access gap between said half protective shield assemblies.

5. The method of claim 4 further comprising accessing fixtures on the surface through said half shield access gap.

6. A method of protecting an exterior surface of a building from damage due to storm conditions, comprising:
providing an exterior surface of a building to be protected;
providing a plurality of protective shield assemblies each including:
a protective shield base having a flat or planar base panel with base panel side edges and base panel end edges;
base panel side walls extending from said base panel side edges;
base panel, end walls extending from said base panel end edges;
a plurality of spaced-apart side shield attachment flanges extending from said base panel side walls,
flange gaps between said side shield attachment flanges and base panel end flanges extending from said base panel end walls, respectively; and
a corrugated panel carried by said base panel of said protective shield base and having a plurality of panel ridges and a plurality of panel troughs alternating with said plurality of panel ridges;
assembling a plurality of shield sections from said plurality of protective shield assemblies by inserting said side shield attachment flanges of each of said protective shield assemblies into said flange gaps of an adjacent one of said protective shield assemblies, positioning said base panel end flange of each of said protective shield assemblies over said base panel end flange of an adjacent one of said protective shield assemblies;
providing a shield section frame on each of said plurality of shield sections; and
attaching said shield section frame to the surface with said corrugated panel facing the surface and said protective shield base facing away from the surface.

7. The method of claim 6 wherein said providing a surface to be protected comprises providing an exterior soffit or fascia of a building.

8. The method of claim 6 wherein said providing a surface to be protected comprises providing an exterior ceiling of a building.

9. The method of claim 6 wherein said assembling a plurality of shield sections from said plurality of protective shield assemblies comprises providing at least one shield section including a plurality of protective shield assemblies and at least one pair of half protective shield assemblies and a half shield access gap between said half protective shield assemblies.

10. The method of claim 9 further comprising accessing fixtures on the surface through said half shield access gap.

11. A method of protecting an exterior surface of a building from damage due to storm conditions, comprising:
providing an exterior surface of a building to be protected;
providing a plurality of protective shield assemblies each including:
a protective shield base having a flat or planar base panel with base panel side edges and base panel end edges;

base panel side walls extending from said base panel side edges;

base panel end walls extending from said base panel end edges;

a plurality of spaced-apart side shield attachment flanges extending from said base panel side walls, flange gaps between said side shield attachment flanges and base panel end flanges extending from said base panel end walls, respectively; and a corrugated panel carried by said base panel of said protective shield base and having a plurality of panel ridges and a plurality of panel troughs alternating with said plurality of panel ridges;

assembling a plurality of shield sections from said plurality of protective shield assemblies by inserting said side shield attachment flanges of each of said protective shield assemblies into said flange gaps of an adjacent one of said protective shield assemblies, positioning said base panel end flange of each of said protective shield assemblies over said base panel end flange of an adjacent one of said protective shield assemblies;

attaching a shield section frame to each of said plurality of shield sections by providing a plurality of frame studs, attaching a plurality of hat channel beams to said plurality of frame studs, and attaching said plurality of hat channel beams to said side shield attachment flanges of said plurality of protective shield assemblies; and attaching said plurality of channel beams frame studs of said shield section frame to the surface with said corrugated panel facing the surface and said protective shield base facing away from the surface.

12. The method of claim 11 wherein said providing an exterior surface of a building to be protected comprises providing an exterior soffit or fascia of a building.

13. The method of claim 11 wherein said providing an exterior surface of a building to be protected comprises providing an exterior ceiling of a building.

14. The method of claim 11 further comprising attaching adjacent shield sections to each other by meshing said side shield attachment flanges of adjacent shield sections with each other and inserting a first one of said base panel end flanges on a first one of said protective shield assemblies over a second one of said base panel end flanges on a second one of said protective shield assemblies.

* * * * *